(12) United States Patent
Feng et al.

(10) Patent No.: US 7,260,063 B2
(45) Date of Patent: Aug. 21, 2007

(54) FRAME RELAY FRAME SHAPING PER DLCI

(75) Inventors: Lei Feng, Ottawa (CA); Siva Kandasamy, Nepean (CA)

(73) Assignee: Ericsson AB, Stockholm (SE)

( * ) Notice: Subject to any disclaimer, the term of this patent is extended or adjusted under 35 U.S.C. 154(b) by 468 days.

(21) Appl. No.: 10/263,598

(22) Filed: Oct. 2, 2002

(65) Prior Publication Data

US 2004/0066784 A1    Apr. 8, 2004

(51) Int. Cl.
*H04J 3/14* (2006.01)
*H04L 12/56* (2006.01)

(52) U.S. Cl. ............... 370/235; 370/395.43; 370/416; 370/468

(58) Field of Classification Search ............... 370/235, 370/238, 252, 395.41, 395.43, 415, 416, 370/230.1; 340/825.5, 825.51
See application file for complete search history.

(56) References Cited

U.S. PATENT DOCUMENTS

| | | | | |
|---|---|---|---|---|
| 5,237,564 | A * | 8/1993 | Lespagnol et al. | 370/398 |
| 5,513,172 | A * | 4/1996 | Shikama et al. | 370/428 |
| 5,521,909 | A * | 5/1996 | Holloway et al. | 370/404 |
| 5,734,654 | A * | 3/1998 | Shirai et al. | 370/396 |
| 5,850,399 | A * | 12/1998 | Ganmukhi et al. | 370/412 |
| 6,108,307 | A * | 8/2000 | McConnell et al. | 370/235 |
| 6,144,669 | A * | 11/2000 | Williams et al. | 370/401 |
| 6,356,561 | B1 * | 3/2002 | Lau et al. | 370/462 |
| 6,456,593 | B1 * | 9/2002 | Iverson et al. | 370/235.1 |

FOREIGN PATENT DOCUMENTS

| | | |
|---|---|---|
| EP | 0 977 405 A1 | 2/2000 |
| WO | WO95/08805 | 3/1995 |
| WO | WO 02/062013 A2 | 8/2002 |

OTHER PUBLICATIONS

Fair, efficient and low-latency packet scheduling using nested deficit round robin Kanhere, S.S.; Sethu, H.; High Performance Switching and Routing, 2001 IEEE Workshop on May 29-31, 2001 pp. 6-10.*

(Continued)

*Primary Examiner*—Hassan Kizou
*Assistant Examiner*—Brian Roberts
(74) *Attorney, Agent, or Firm*—Ansel M. Schwartz

(57) ABSTRACT

A switch of a network, which services a contract, for switching frame relay frames having a variable size. The switch includes ports through which frames are received from and sent to the network. The switch includes a memory in which data of the frames is stored, the memory in communication with the ports. The switch includes a processor which sends traffic contract conforming frames within a first time interval having a bandwidth to the network and adds unusable bandwidth from the first time interval to a second time interval in which the processor sends data to the network. A method for switching frame relay frames having a variable size in a network, which services a contract.

18 Claims, 5 Drawing Sheets

OTHER PUBLICATIONS

Efficient fair queuing using deficit round-robin Shreedhar, M.; Varghese, G.; Networking, IEEE/ACM Transactions on vol. 4, Issue 3, Jun. 1996 pp. 375-385.*

Shreedhar, M. et al., "Efficient Fair Queuing Using Deficit Round Robin," Computer Communication Review, Association for Computing Machinery (New York, US), vol. 25 (No. 4), (Oct. 1, 1995).

Kanhere, Salil S. et al., "Fair, Efficient and Low-Latency Packet Scheduling Using Nested Deficit Round Robin," Conference Proceedings Article, (May 29, 2001).

Platt et al., "Traffic Management in Frame Relay Networks," Computer Networks and ISDN Systems, North Holland Publishing (Amsterdam, NL), vol. 23 (No. 4), (Jan. 23, 1992).

* cited by examiner

FRAME RELAY FRAME SHAPING PER DLCI

FIELD OF THE INVENTION

The present invention relates to switching frame relay frames having a variable size. More specifically, the present invention relates to switching frame relay frames having a variable size which adds unusable bandwidth from a time interval to a next adjacent time interval for a connection.

BACKGROUND OF THE INVENTION

Frames of multiple DLCIs within the same FR UNI/NNI interface may be running at different traffic rates. It is very important or desirable to control and shape the per DLCI traffic to a subscription time traffic contract so that one DLCI doesn't take the bandwidth of another DLCI in the FR UNI/NNI. Also, it is desirable to prioritize the per DLCI traffic into different classes. The Frame Shaping technique used in the present invention controls and shapes the per DLCI traffic.

SUMMARY OF THE INVENTION

The present invention pertains to a switch of a network, which services a contract, for switching frame relay frames having a variable size. The switch comprises ports through which frames are received from and sent to the network. The switch comprises a memory in which data of the frames is stored, the memory in communication with the ports. The switch comprises a processor which sends traffic contract conforming frames within a first time interval having a bandwidth to the network and adds unusable bandwidth from the first time interval to a second time interval in which the processor sends data to the network.

The present invention pertains to a method for switching frame relay frames having a variable size in a network, which services a contract. The method comprises the steps of receiving frames from the network at ports of a switch in communication with the network. There is the step of storing data of the frames in a memory received at the ports. There is the step of sending with a processor traffic contract conforming frames within a first time interval having a bandwidth to the network. There is the step of keeping track of unusable bandwidth of the first time interval. There is the step of adding unusable bandwidth from the first time interval to a second time interval in which the processor sends data to the network. There is the step of sending with the processor traffic contract conforming frames within the second time interval with the unusable bandwidth from the first time interval added to the second time interval.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
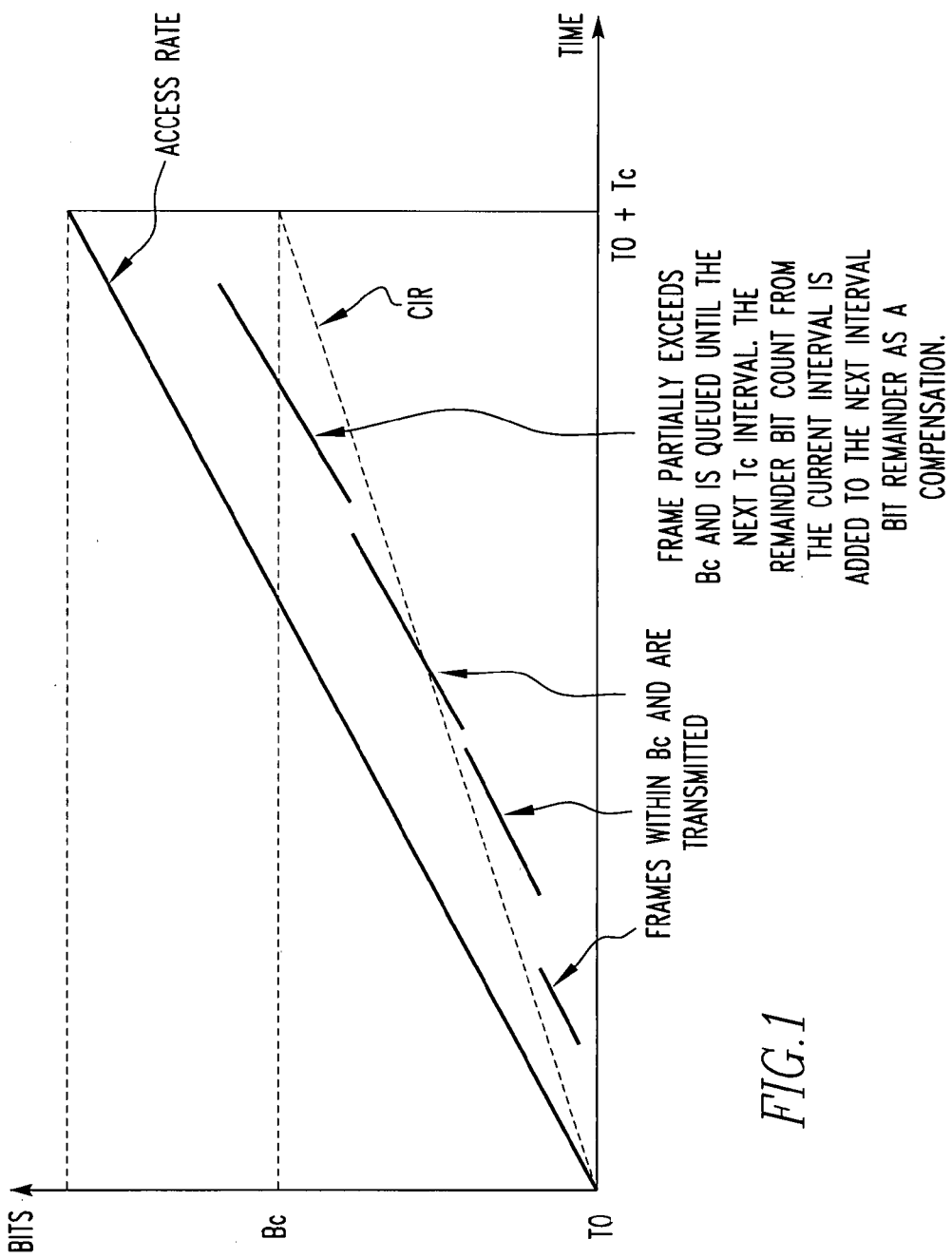
FIG. 1 shows the relationship between Frame, Bc, CIR, Access Rate and Tc.
Figure 2:
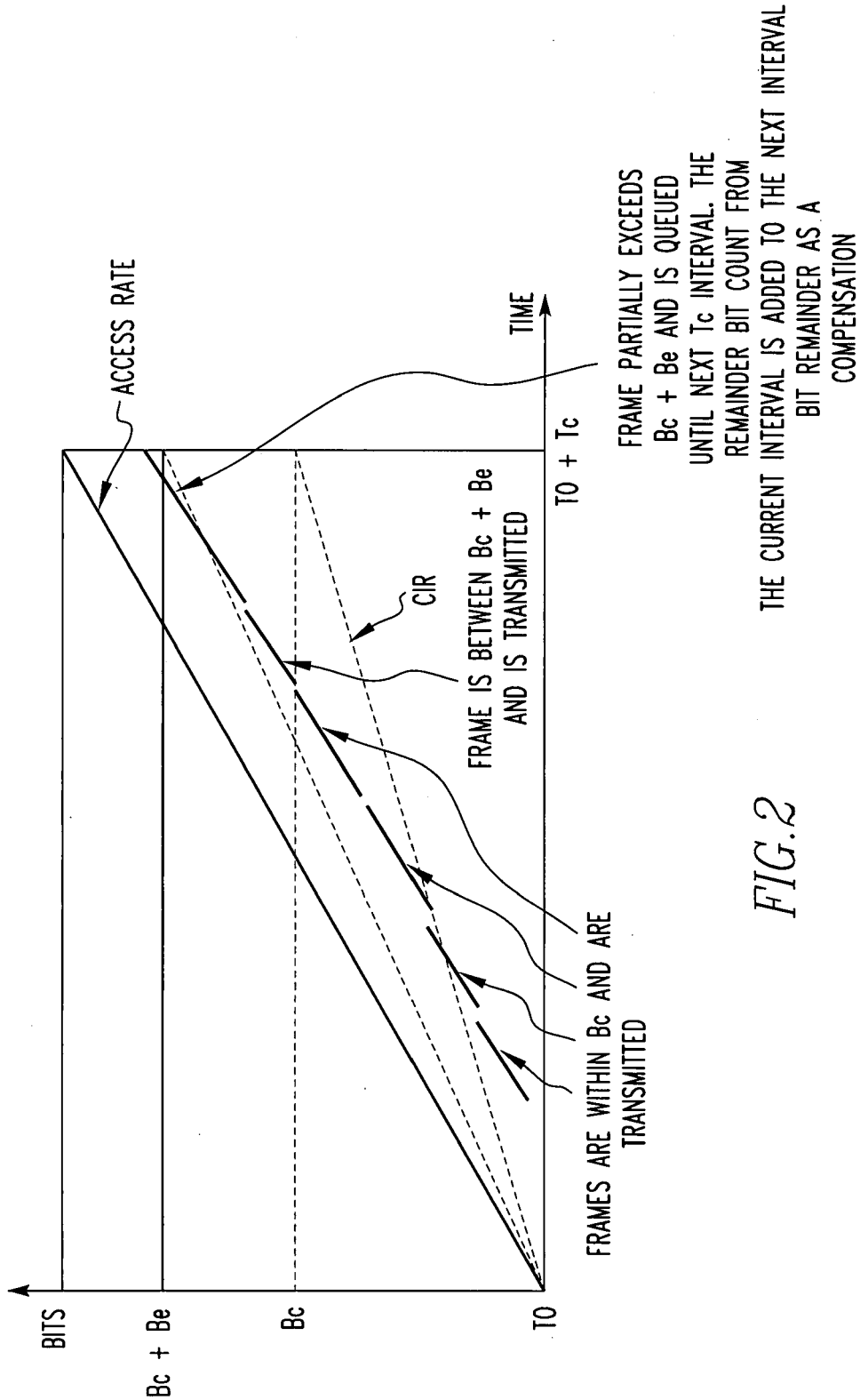
FIG. 2 shows the relationship between Frame, Bc, CIR, Be, Access Rate and Tc.
Figure 3:
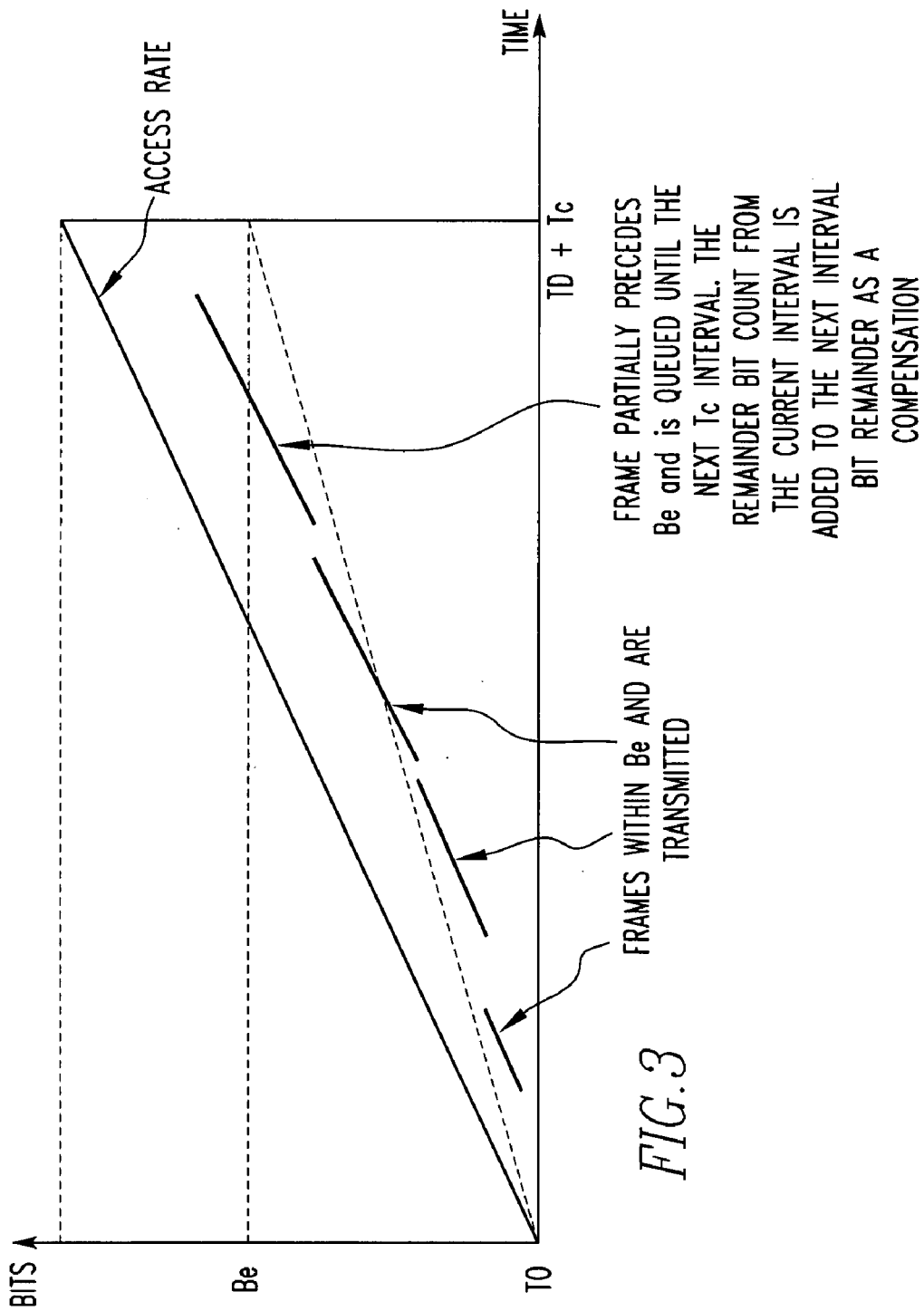
FIG. 3 shows the relationship between Frame, Be, Access Rate and Tc.
Figure 4:
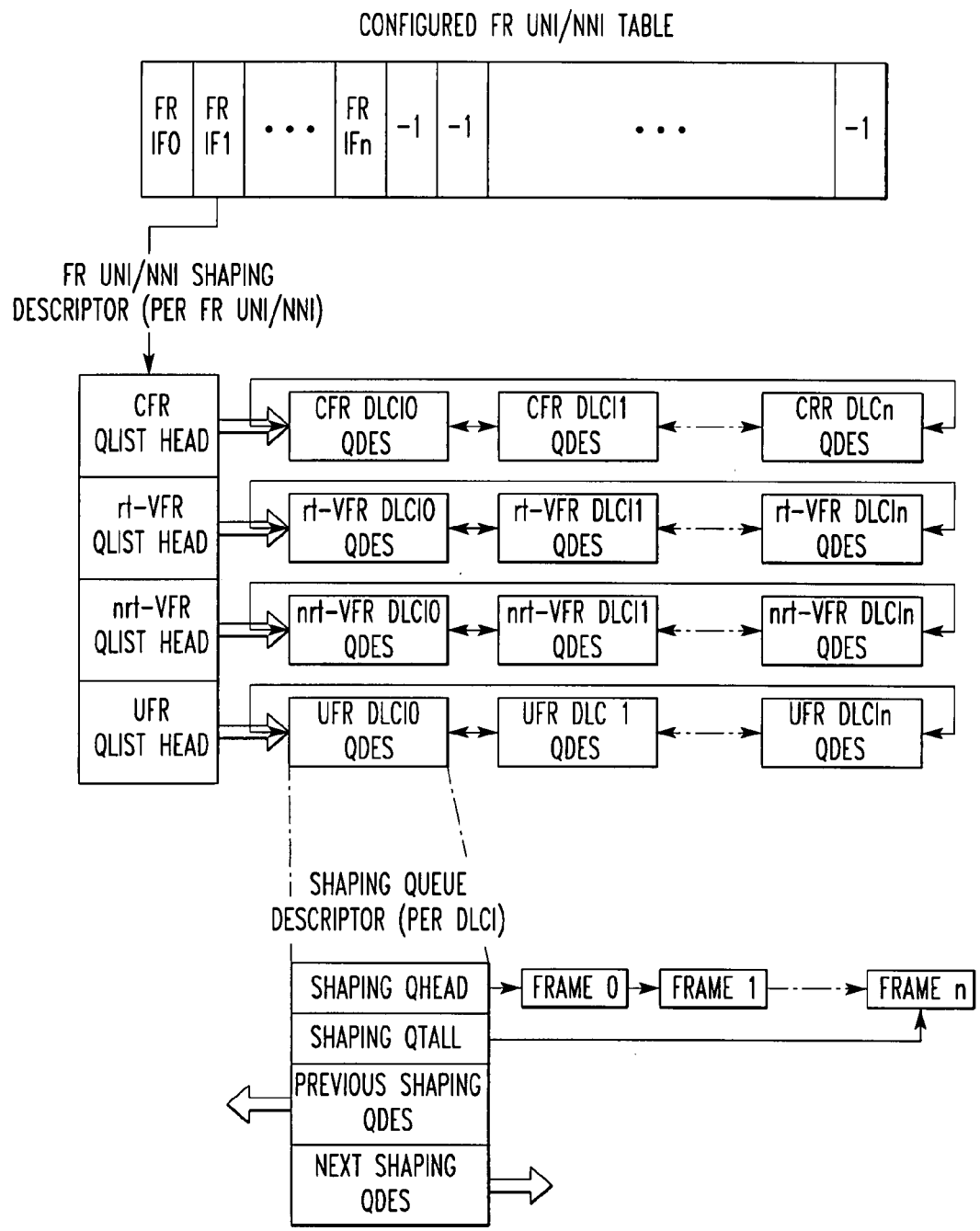
FIG. 4 shows shaping descriptors relationship.
Figure 5:
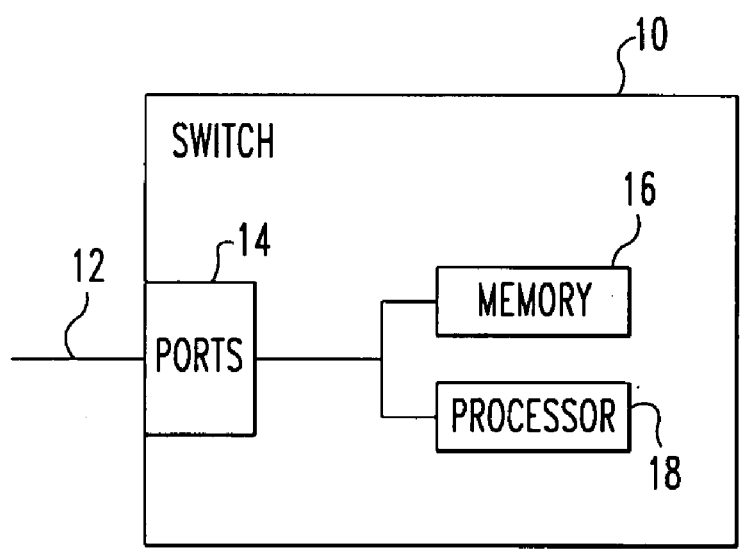
FIG. 5 is a schematic representation of the switch of the present invention.

Referring now to the drawings wherein like reference numerals refer to similar or identical parts throughout the several views, and more specifically to FIG. 5 thereof, there is shown a switch 10 of a network 12, which services a contract, for switching frame relay frames having a variable size. The switch 10 comprises ports 14 through which frames are received from and sent to the network 12. The switch 10 comprises a memory 16 in which data of the frames is stored, the memory 16 in communication with the ports 14. The switch 10 comprises a processor 18 which sends traffic contract conforming frames within a first time interval having a bandwidth to the network 12 and adds unusable bandwidth from the first time interval to a second time interval in which the processor 18 sends data to the network 12.

The processor 18 preferably includes an Intel IXP 1200 network processor 18 for serving the frames with the intervals, and an FPGA (Field Programmable Gate Array) connected to the ports 14 and the network processor 18. The ports 14, such as of a network interface card, provide the frames to the FPGA and then to the memory 16 for the network processor 18, after the FPGA performs an error check on the frames and determines which channel a given frame is associated with.

Preferably, the frames are associated with categories and the processor 18 sends data from the frames according to the frames' categories. The processor 18 preferably performs frame relay traffic management on the frames received from the network 12 characterized at ports 14 by CIR—Committed Information Rate in bits/seconds, $0<=CIR<AR$, where AR is the Frame Relay channel Access Rate; Bc—Committed Burst Size in bits; Be—Excess Burst Size in bits; and Category.

Preferably, the processor 18 shapes the frames the processor 18 sends to the network 12 according to a rate control based on Bc/Be/CIR/AR and a committed time interval Tc, which is derived as follows:

$Tc=Bc/CIR$ when $CIR!=0$ or $Tc=Be/AR$ when $CIR=0$.

The categories of frames the processor 18 services and the priority in which the processor 18 services the frames, where 0 is the highest priority, are preferably defined as:

| CFR | - CIR ! = 0, Bc ! = 0, Be = 0, | Priority = 0 |
|---|---|---|
| rtVFR | - CIR ! = 0, Bc ! = 0, Be >= 0, | Priority = 1 |
| nrtVFR | - CIR ! = 0, Bc ! = 0, Be >= 0, | Priority = 2 |
| UFR | - CIR = 0, Bc = 0, | Priority = 3. |

Preferably, in each time interval, the processor 18 transmits data from CFR frames first than VFR frames are only transmitted when there is no more CFR frames ready to be transmitted in this interval; in VFR frames, the rtVFR frames conforming to Bc are first transmitted and then the nrtVFR frames conforming to Bc are transmitted; when there are no more rtVFR or nrtVFR frames within Bc, then the frames within Bc+Be are transmitted accordingly; the UFR frames are transmitted only when there are no more CFR or VFR frames waiting to be transmitted.

The memory 16 preferably includes per DLCI queues in which data from frame relay connections are stored. Preferably, the queues of frames from connections having the same classification are serviced by the processor 18 in round robin fashion.

The present invention pertains to a method for switching frame relay frames having a variable size in a network 12, which services a contract. The method comprises the steps of receiving frames from the network 12 at ports 14 of a switch in communication with the network 12. There is the step of storing data of the frames in a memory 16 received at the ports 14. There is the step of sending with a processor 18 traffic contract conforming frames within a first time interval having a bandwidth to the network 12. There is the step of keeping track of unusable bandwidth of the first time interval. There is the step of adding unusable bandwidth from the first time interval to a second time interval in which the processor 18 sends data to the network 12. There is the step of sending with the processor 18 traffic contract conforming frames within the second time interval with the unusable bandwidth from the first time interval added to the second time interval.

Preferably, the frames are associated with categories and wherein the sending within a first interval step includes the step of sending with the processor 18 data from the frames according to the frames' categories. There is preferably the step of performing frame relay traffic management on the frames received from the network 12 characterized at ports 14 by CIR—Committed Information Rate in bits/seconds, $0<=CIR<AR$, where AR is the Frame Relay channel Access Rate; Bc—Committed Burst Size in bits; Be—Excess Burst Size in bits; and Category.

Preferably, there is the step of shaping the frames the processor 18 sends to the network 12 according to a rate control based on Bc/Be/CIR/AR and a committed time interval Tc, which is derived as follows:

Tc=Bc/CIR when $CIR!=0$ or

Tc=Be/AR when $CIR=0$.

The categories of frames the processor 18 services and the priority in which the processor 18 services the frames, where 0 is the highest priority, are preferably defined as:

| CFR | - CIR ! = 0, Bc ! = 0, Be = 0, | Priority = 0 |
|---|---|---|
| rtVFR | - CIR ! = 0, Bc ! = 0, Be >= 0, | Priority = 1 |
| nrtVFR | - CIR ! = 0, Bc ! = 0, Be >= 0, | Priority = 2 |
| UFR | - CIR = 0, Bc = 0, | Priority = 3. |

Preferably, in each time interval, the processor 18 transmits data from CFR frames first than VFR frames are only transmitted when there is no more CFR frames ready to be transmitted in this interval; in VFR frames, the rtVFR frames conforming to Bc are first transmitted and then the nrtVFR frames conforming to Bc are transmitted; when there are no more rtVFR or nrtVFR frames within Bc, then the frames within Bc+Be are transmitted accordingly; the UFR frames are transmitted only when there are no more CFR or VFR frames waiting to be transmitted.

The memory 16 preferably includes per DLCI queues in which data from frame relay connections are stored. Preferably, the queues of frames from connections having the same classification are serviced by the processor 18 in round robin fashion.

In the operation of the invention, unlike ATM where each cell is fixed size, Frame Relay frames are variable in nature and this makes the frame shaping a challenging process. An efficient method of Frame Relay Shaping is now described.

Frame Relay Traffic Management is characterized by four subscription time parameters and they are:

i) CIR—Committed Information Rate in bits/seconds, $0<=CIR<AR$, where AR is the Frame Relay channel Access Rate;

ii) Bc—Committed Burst Size in bits;

iii) Be—Excess Burst Size in bits; and iv) Category

Frame Shaping is done by a combination of per DLCI queuing and a Rate Control Based on Bc/Be/CIR/AR and a committed time interval Tc, which is derived as follows:

Tc=Bc/CIR when $CIR!=0$ or

Tc=Be/AR when $CIR=0$.

Four different categories of Frame Relay Traffic is defined as follows (0 is the highest priority):

| CFR | - CIR ! = 0, Bc ! = 0, Be = 0, | Priority = 0 |
|---|---|---|
| rtVFR | - CIR ! = 0, Bc ! = 0, Be >= 0, | Priority = 1 |
| nrtVFR | - CIR ! = 0, Bc ! = 0, Be >= 0, | Priority = 2 |
| UFR | - CIR = 0, Bc = 0, | Priority = 3. |

In general, in each shaping period, CFR frames are transmitted first. VFR frames are only transmitted when there is no more CFR frames ready to be transmitted in this interval. In VFR frames, the rtVFR frames conforming to Bc are first transmitted and then the nrtVFR frames conforming to Bc are transmitted. When there are no more rtVFR or nrtVFR frames within Bc, then the frames within Bc+Be are transmitted accordingly. The UFR frames are transmitted only when there are no more CFR or VFR frames waiting to be transmitted.

The shaping algorithm is now described.

With respect to the data description, the shaping descriptors used in shaping algorithm includes the following:

Configured FR UNI/NNI Table: contains all the configured FR UNI/NNIs and is used as an FR UNI/NNI polling table for a shaping module. Each valid entry points to a configured FR UNI/NNI Shaping Descriptor. This table is system level.

FR UNI/NNI Shaping Descriptor: contains the 4 priority DLCI shaping queue descriptor lists. Each list links that priority's DLCI shaping queue descriptors for the shaping module to dump frames. The DLCI shaping queue descriptor only gets enlisted to the list when there are frames in its shaping queue. It will be delisted when its shaping queue is empty. This descriptor is per UNI/NNI.

Shaping Queue Descriptor: holds the DLCI shaping queue information, i.e. queue head and queue tail. This descriptor is per DLCI.

With respect to the logic description and frame enqueue, the received frames on one DLCI are always enqueued to its dedicated DLCI shaping queue. The data of the frame is stored in SDRAM and a pointer associated with the data is stored in SRAM. If the shaping queue is empty when the frame is received, it will be enlisted to the correspondent class Queue Descriptor List of the FR UNI/NNI Descriptor.

In regard to the frame check order, to dump the frames from the shaping queue to the HDLC interface, the shaping module checks the enqueued frames against the contract. If the frame doesn't violate the contract, it will be transmitted out. To keep the priority, the frame will be checked according to the priority of the DLCI they belonged to. The frame check order is as follows:

CFR→rt-VFR Bc→nrt-VFR Bc→rt-VFR Be→nrt-VFR Be→UFR

All the frames belong to CFR DLCI will be continuous dumped out if they don't exceed Bc within the checking interval. For other DLCI frames, whenever a frame is dumped out, the existed higher priority DLCI shaping queues will be check again in case there are new frames received by higher priority DLCIs.

The end condition for polling over a FR UNI/NNI is:
All the DLCIs has been polled and no more frames can be dumped out.
The transmitted frame number reached the pre-configured limit for a FR UNI/NNI.

As a simple example, in a first interval for a connection, there is 4 K of bandwidth allocated, but only 3.5 K of data from packets conforms with the contract in the first interval. Thus, 0.5 K of bandwidth of the first interval is unusable. In the next interval for the connection, the 0.5 K of unusable bandwidth from the first interval is added to the next interval, thus allocating 4.5 K of bandwidth by the next interval for the connection. In turn, whatever bandwidth is unusable in the next interval is added to the next interval after that for the connection. The network processor 18 keeps track of the unusable bandwidth from one interval to next for a connection.

The following definitions are applicable to the terms used herein.

| | |
|---|---|
| DLCI: | Data Link Connection Identifier |
| CFR: | Constant Frame Rate |
| rtVFR: | realtime Variable Frame Rate |
| nrtVFR: | non-realtime Variable Frame Rate |
| UFR: | Unspecified Frame Rate |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch of a network, which services a contract which defines time intervals and allocates a predetermined amount of bandwidth to the intervals, for switching frame relay frames having a variable size comprising:
   ports through which frames are received from and sent to the network;
   a memory in which data of the frames is stored, the memory in communication with the ports; and
   a processor which sends traffic contract conforming frames within a first time interval having a predetermined amount of bandwidth to the network and adds unusable bandwidth from the first time interval to a second time interval having a predetermined amount of bandwidth in which the processor sends data to the network so the second interval has the predetermined amount of bandwidth allocated to it by the contract plus the unusable bandwidth from the first interval, the contract defining the first time interval and the second time interval and allocates the predetermined amount of bandwidth to the first and second intervals.

2. A switch as described in claim 1 wherein the frames are associated with categories and the processor sends data from the frames according to the frames' categories.

3. A switch as described in claim 2 wherein the processor performs frame relay traffic management on the frames received from the network characterized at ports by CIR—Committed Information Rate in bits/seconds, 0<=CIR<AR, where AR is the Frame Relay channel Access Rate; Bc—Committed Burst Size in bits; Be—Excess Burst Size in bits; and Category.

4. A switch as described in claim 3 wherein the processor shapes the frames the processor sends to the network according to a rate control based on Bc/Be/CIR/AR and a committed time interval Tc, which is derived as follows:

Tc=Bc/CIR when $CIR!=0$ or

Tc=Be/AR when $CIR=0$.

5. A switch as described in claim 4 wherein the categories of frames the processor services and the priority in which the processor services the frames, where 0 is the highest priority, are defined as:

| | | |
|---|---|---|
| CFR | - CIR ! = 0, Bc ! = 0, Be = 0, | Priority = 0 |
| rtVFR | - CIR ! = 0, Bc ! = 0, Be >= 0, | Priority = 1 |
| nrtVFR | - CIR ! = 0, Bc ! = 0, Be >= 0, | Priority = 2 |
| UFR | - CIR = 0, Bc = 0, | Priority = 3. |

6. A switch as described in claim 5 wherein in each time interval, the processor transmits data from CFR frames first than VFR frames are only transmitted when there is no more CFR frames ready to be transmitted in this interval; in VFR frames, the rtVFR frames conforming to Bc are first transmitted and then the nrtVFR frames conforming to Bc are transmitted; when there are no more rtVFR or nrtVFR frames within Bc, then the frames within Bc+Be are transmitted accordingly; the UFR frames are transmitted only when there are no more CFR or VFR frames waiting to be transmitted.

7. A switch as described in claim 6 wherein the memory includes per DLCI queues in which data from frame relay connections are stored.

8. A switch as described in claim 7 wherein the queues of frames from connections having the same classification are serviced by the processor in round robin fashion.

9. A switch as described in claim 8 wherein the second interval is a next interval after the first interval.

10. A method for switching frame relay frames having a variable size in a network, which services a contract which defines time intervals and allocates a predetermined amount of bandwidth to the intervals, comprising the steps of:
   receiving frames from the network at ports of a switch in communication with the network;
   storing data of the frames in a memory received at the ports;
   sending with a processor traffic contract conforming frames within a first time interval having a predetermined amount of bandwidth to the network;
   keeping track of unusable bandwidth of the first time interval;
   adding unusable bandwidth from the first time interval to a second time interval having a predetermined amount of bandwidth in which the processor sends data to the network; and
   sending with the processor traffic contract conforming frames within the second time interval with the unusable bandwidth from the first time interval added to the second time interval so the second interval has the predetermined amount of bandwidth allocated to it by the contract plus the unusable bandwidth from the first interval, the contract defining the first time interval and the second time interval and allocates the predetermined amount of bandwidth to the first and second intervals.

11. A method as described in claim 10 wherein the frames are associated with categories and wherein the sending within a first interval step includes the step of sending with the processor data from the frames according to the frames' categories.

12. A method as described in claim 11 including the step of performing frame relay traffic management on the frames received from the network characterized at ports by CIR—Committed Information Rate in bits/seconds, $0<=CIR<AR$, where AR is the Frame Relay channel Access Rate; Bc—Committed Burst Size in bits; Be—Excess Burst Size in bits; and Category.

13. A method as described in claim 12 including the step of shaping the frames the processor sends to the network according to a rate control based on Bc/Be/CIR/AR and a committed time interval Tc, which is derived as follows:

Tc=Bc/CIR when $CIR!=0$ or

Tc=Be/AR when $CIR=0$.

14. A method as described in claim 13 wherein the categories of frames the processor services and the priority in which the processor services the frames, where 0 is the highest priority, are defined as:

| | | |
|---|---|---|
| CFR | - CIR ! = 0, Bc ! = 0, Be = 0, | Priority = 0 |
| rtVFR | - CIR ! = 0, Bc ! = 0, Be >= 0, | Priority = 1 |
| nrtVFR | - CIR ! = 0, Bc ! = 0, Be >= 0, | Priority = 2 |
| UFR | - CIR = 0, Bc = 0, | Priority = 3. |

15. A method as described in claim 14 wherein in each time interval, the processor transmits data from CFR frames first than VFR frames are only transmitted when there is no more CFR frames ready to be transmitted in this interval; in VFR frames, the rtVFR frames conforming to Bc are first transmitted and then the nrtVFR frames conforming to Bc are transmitted; when there are no more rtVFR or nrtVFR frames within Bc, then the frames within Bc+Be are transmitted accordingly; the UFR frames are transmitted only when there are no more CFR or VFR frames waiting to be transmitted.

16. A method as described in claim 15 wherein the memory includes per DLCI queues in which data from frame relay connections are stored.

17. A method as described in claim 16 wherein the queues of frames from connections having the same classification are serviced by the processor in round robin fashion.

18. A method as described in claim 17 wherein the adding step includes the step of adding unusable bandwidth from the first interval to the second interval, where the second interval is a next interval after the first interval.

* * * * *

UNITED STATES PATENT AND TRADEMARK OFFICE
CERTIFICATE OF CORRECTION

| | | |
|---|---|---|
| PATENT NO. | : 7,260,063 B2 | Page 1 of 1 |
| APPLICATION NO. | : 10/263598 | |
| DATED | : August 21, 2007 | |
| INVENTOR(S) | : Feng et al. | |

It is certified that error appears in the above-identified patent and that said Letters Patent is hereby corrected as shown below:

In Column 6, Line 32, in Claim 6, delete "than" and insert -- then --, therefor.

In Column 8, Line 11, in Claim 15, delete "than" and insert -- then --, therefor.

Signed and Sealed this

Sixth Day of January, 2009

JON W. DUDAS
*Director of the United States Patent and Trademark Office*